June 19, 1962    J. G. BAKER    3,039,361
LENS SYSTEMS HAVING WIDE ANGLE OBJECTIVES
Filed Aug. 17, 1959     3 Sheets-Sheet 1

INVENTOR.
JAMES G. BAKER
ATTORNEYS

3,039,361
LENS SYSTEMS HAVING WIDE ANGLE OBJECTIVES

James G. Baker, 7 Grove St., Winchester, Mass.
Filed Aug. 17, 1959, Ser. No. 834,268
14 Claims. (Cl. 88—57)

This invention pertains to wide angle optical objectives of a class used generally in aerial mapping systems, although other wide angle applications, as in microscopy, are also involved.

My prior Patent No. 2,821,113 concerns a basic form of wide angle optical objective. The invention herein disclosed carries forward certain principles included in said patent, and achieves greater lens speeds without sacrifice of resolving power, contrast, or correction for distortion.

Objectives of the class covered in the referenced patent combine favorable features of the two extreme types of wide angle objectives, the first being basically a Gauss type objective with various modifications according to application, and the second being an inverted telephoto objective having favorable illuminating power over the full field, but also having considerable physical bulk. Objectives of the basic form described in the referenced patent are intermediate between the two above extremes in physical size but offer other advantages in the nature of improved resolving power and improved contrast rendition derived from the pattern of glass types and lens data employed.

Such earlier objectives, as contrasted with those of the instant disclosure having greater speed for high quality performance, are characterized by the use of outlying doublets that have their outermost elements in the form of positive menisci and their innermost elements in the form of strong negative menisci. In addition, there is a central air-space providing room for a between-the-lens shutter, where the lens groups on either side have substantial positive optical power and are arranged more or less symmetrically around the central stop. The choice of glass types and lens data is then derived from the need to correct the objective at an adopted aperture ratio and focal length for the aberrations of spherical aberration, coma, astigmatism, curvature of field and distortion, and finally for longitudinal and lateral chromatism, and for chromatic spherical aberration and chromatic coma.

For most applications in the aerial mapping application it is vital to have an objective capable of forming a sharp image at maximum contrast on a flat image plane with distortion held to almost negligible residuals over the full field. For example, an objective of 6 inches focal length covering a 94-degree diagonal full field might be expected to have distortion residuals not exceeding 10 microns anywhere in the field, where the distortion is measured in terms of the lateral displacement in the image plane of the actual from the ideal grid points. Similarly, an objective of 3 inches focal length might be expected to have distortion residuals not exceeding 5 microns anywhere in the field. Such stringent requirements for correction of distortion lead in turn to close tolerances in every way in production and require excellent workmanship. In the design phase such correction of distortion has a determining effect on choice of basic lens type.

For certain other types of application, as in wide field microscopy, correction for distortion becomes relatively unimportant and greater freedom is permitted in adapting the optical system to the different function. Indeed, where the full field might not exceed 30 degrees in the application to microscopy, the higher order terms become negligible and the distortion in any case would not reach any very large amount.

On the other hand, in application to microscopy it is of vital importance that the objective be corrected completely for spherical aberration and coma over the adopted field, and that tangential and radial astigmatism be held to negligible residuals. In general, it would be of less importance for the field to be precisely flat, but on the other hand, if such a fully flat field is attained in a practical way, greater convenience in use will have been achieved.

My present invention in part resides in effecting novel improvements in the basic lens form described in said U.S. Patent 2,821,113, leading to a wide range of useful applications for the resulting new class of optical objectives. For example, in some forms of precision aerial mapping cameras it is desired to have a glass pressure plate adjacent to and preceding the image plane. This glass plate then serves to hold the photographic film precisely flat against a flat back-up platen, and also as required can be engraved with reticle lines that in superposition on each aerial photograph will aid in reduction and measurement.

The interposition of such glass pressure plate in the optical path leads to severe optical consequences for a 94-degree wide angle objective. It necessitates glass types and lens data correlated in an optimum way with the interposed glass plate, but even so there is a limitation on the ultimate lens speed that can be achieved in this combination. In Example I, I present an objective having an aperture-ratio of 1:3.5, which though considerably faster than existing wide angle objectives of the inverted telephoto form, or of the Gauss form, is still not as fast as it might be if the pressure plate were to be omitted. Therefore, in Example II, I present just such an objective which no longer has a pressure plate. By optimizing the design one can achieve in this way an aperture ratio of 1:2.5.

For applications in microscopy it would generally be required to have a cover glass for mounted specimens or liquid filled cells, but frequently also, one may wish to examine flat surfaces or to view small objects on flat surfaces where a cover glass or pressure plate cannot be used. Fortunately, for the more restricted field to be employed in microscopy, say of 30 degrees or less, the insertion of or omission of a cover glass or pressure plate becomes less important to the final state of correction than is the case for the 94-degree wide angle mapping application. Moreover, for applications in microscopy the equivalent focal length in general would necessarily be adopted as a comparatively few millimeters, whereas in aerial mapping objectives, focal lengths from 75 to 150 mm. are usually required. Also in microscopy it may be preferred that the rear doublet be designed as a cemented doublet to remove scattered light from the system.

If the objective of Example II were to be used as a wide field microscopic objective, at a numerical aperture of 0.2, focal lengths from 4 to 25 mm. might be preferred, according to the application. Thus, a 25.4 mm. objective covering a total field of 30 degrees would be capable of projecting a 10 x 10 mm. square object area onto a 200 x 200 mm. flat image plane, where a movable eyepiece in x and y might be employed, or where pictures of several sizes might conveniently be taken without appreciable loss of resolving power anywhere in the field, or finally where one might simply view it on a projection screen if the illumination suffices. Perhaps even greater magnifications might usefully be employed for the last mentioned purpose of visual examination on movie type screens, according to the possibilities.

The objectives given by way of example in Examples I and II are corrected for maximum performance over full 94-degree fields for which the desirable correction for distortion has been achieved. Example I, however, must employ a further slight modification if distortion correction at 47 degrees off-axis is to be maintained in that the glass pressure plate must be slightly aspheric in the corners. If distortion correction is important out to only 42.5 degrees off-axis, the glass pressure plate can remain optically plane-parallel and flat on both surfaces. On the other hand, either lens system can employ a further slight figuring of the last refracting surface, excluding any pressure plate, in zones for the purpose of eliminating the residual distortion altogether, if such supreme correction is needed.

Example III corresponds to Example II but has been slightly modified in the aspheric figuring on the surfaces adjacent to the central stop to serve as a wide angle microscope objective. Because of the far smaller full field, one can also reduce the clear apertures of the outlying refracting surfaces.

Indeed, it is essential to the optimum performance of this class of wide angle objectives that the two surfaces adjacent to the central stop be figured aspherically to a shape dependent on the aperture-ratio, field angle and color correction. One will find that the larger the field angle to be covered, the more aspheric the figuring to achieve optimum balance of comatic residuals at some chosen node in the field. Without the aspheric figuring one would quickly find that the comatic residuals become unacceptably large. In general, the aspheric shape of the surface on the long conjugate side of the central stop tends toward an "up-edge," which is to say, that the zones increasingly far from the axis become increasingly negative in optical effect. However, it has proved possible to have the 5th order term governing the slope of the aspheric, which is the sixth order term in the depth, of reversed algebraic sign. This feature causes the rate of change of the up-edge to decrease at the periphery, which ultimately would lead to a turned-down edge at zones outside the working aperture. Such a rolled shape favors the polishing action in the process of aspheric figuring and renders fabrication not quite so difficult as it otherwise would be for an aspheric shape having ever-increasing turned-up effect.

Also in general, the aspheric shape of the surface on the short conjugate side of the central stop tends toward a "down-edge," which is to say, that the zones increasingly far from the axis become increasingly positive in optical effect. Here in addition the 6th order term in the depth becomes even more turned-down in effect. The optician therefore will find that his figuring toward a turned-down shape will proceed in a natural way and that his ring laps will tend to follow a smooth curve.

In the Examples I, II and III the aspheric shapes are described by the following expression:

$$\xi_i = \frac{C_i \eta_i^2}{1+\sqrt{1-C_i^2 \eta_i^2}} + \beta_i \eta_i^4 + \gamma_i \eta_i^6 + \delta_i \eta_i^8 + \epsilon_i \eta_i^{10}$$

where $C_i$ is the curvature of the $i$th surface, $\beta_i$, $\gamma_i$, $\delta_i$, and $\epsilon_i$ (beta$_i$, gamma$_i$, delta$_i$ and epsilon$_i$) are the coefficients of the aspheric polynomial terms, and $\xi_i$ (xi$_i$) and $\eta_i$ (eta$_i$) are the sagitta and zone height respectively. Thus, for any given $\eta_i$, one can compute $\xi_i$. In general, one tabulates $\xi_i$ as a function of $\eta_i$, from which the properly shaped aspheric lapping tools can be made. In the corresponding data given in the examples below, all dimensional data are given in terms of the calibrated focal length as unit length, where the calibrated focal length is the adjusted equivalent focal length needed to reduce the overall distortion residuals to a minimum (scale adjustment). Hence, to convert to millimeters one must multiply all dimensional quantities by the desired focal length in millimeters, whatever it may be.

Figure 1:
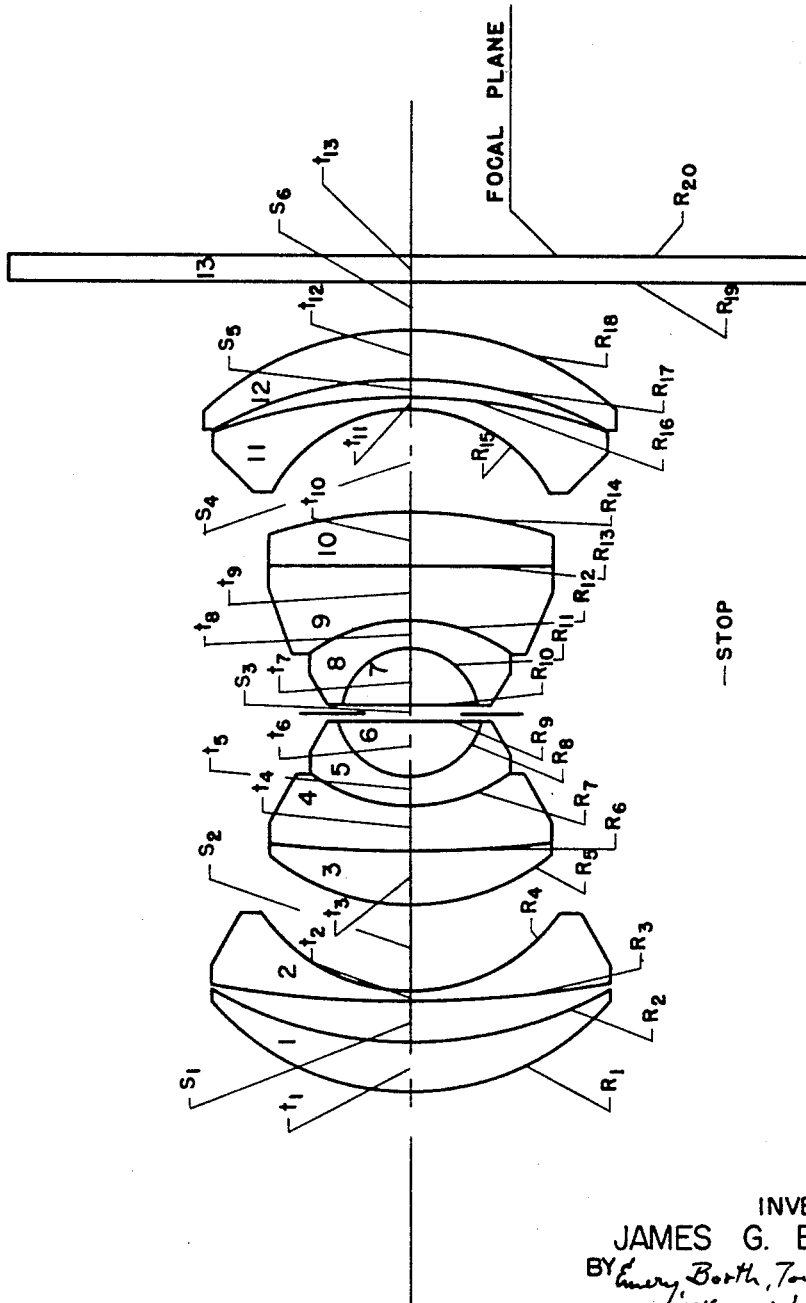
FIG. 1 is a graphical portrayal of a system such as that of Example I.

Referring now more particularly to FIGURE 1 and a first example, in which and in the other examples the Roman numerals designate the lens elements of the system, R is the radius of curvature, $t$ is the axial thickness, S is the axial separation, $n_D$ is the index of refraction for the D-line of the spectrum (5893 angstroms, being the mean of the sodium doublet), $\nu$ (nu) is the Abbe number, and the right-hand column indicates exemplary glass types.

*Example I*

[C.F.L.=1.00000. E.F.L.=0.99966. f/3.5]

| Element | Radii | Thicknesses | $n_D$ | $\nu$ | Type |
|---|---|---|---|---|---|
| I | $R_1 = 0.69351$ | $t_1 = 0.12136$ | 1.56376 | 60.76 | 564608 |
|  | $R_2 = 1.05077$ | $S_1 = 0.10403$ |  |  |  |
| II | $R_3 = 2.92136$ | $t_2 = 0.02774$ | 1.8037 | 41.80 | 804418 |
|  | $R_4 = 0.47243$ | $S_2 = 0.22539$ |  |  |  |
| III | $R_5 = 0.58352$ | $t_3 = 0.13508$ | 1.8804 | 41.10 | 880411 |
| IV | $R_6 = 3.46755$ | $t_4 = 0.11512$ | 1.67252 | 32.23 | 673322 |
| V | $R_7 = 0.43344$ | $t_5 = 0.07282$ | 1.8037 | 41.80 | 804418 |
| VI | $R_8 = 0.18743$ | $t_6 = 0.13870$ | 1.7767 | 44.69 | 777447 |
|  | $R_9 =$ Aspheric [1] | $S_3 = 0.04161$ [2] |  |  |  |
|  | $R_{10} =$ Aspheric [1] |  |  |  |  |
| VII | $R_{11} = -0.17338$ | $t_7 = 0.13870$ | 1.7767 | 44.69 | 777447 |
| VIII | $R_{12} = -0.43344$ | $t_8 = 0.07282$ | 1.8037 | 41.80 | 804418 |
| IX | $R_{13} =$ plano | $t_9 = 0.14181$ | 1.67252 | 32.23 | 673322 |
| X | $R_{14} = -1.19378$ | $t_{10} = 0.13508$ | 1.8804 | 41.10 | 880411 |
|  | $R_{15} = -0.40014$ | $S_4 = 0.26994$ |  |  |  |
| XI | $R_{16} = -1.51526$ | $t_{11} = 0.02774$ | 1.75766 | 31.56 | 758316 |
|  | $R_{17} = -1.08105$ | $S_5 = 0.03468$ |  |  |  |
| XII | $R_{18} = -0.80335$ | $t_{12} = 0.12483$ | 1.8037 | 41.80 | 804418 |
|  | $R_{19} =$ plano [3] | $S_6 = 0.12578$ |  |  |  |
| XIII | $R_{20} =$ plano [4] | $t_{13} = 0.06450$ | 1.51700 | 64.5 | 517645 |
|  |  | $S_{20} = 0.00000$ |  |  |  |

[1] Surfaces 9 and 10 above are both aspheric, have coefficients taken from the equation just previously herein stated, and have the following shapes for a 94-degree full field:

$C_9 = +.014419$; $\beta_9 = +0.60498$; $\gamma_9 = -8.90316$; $\delta_9 = 0$; $\epsilon_9 = +837.42$.
$C_{10} = -.014419$; $\beta_{10} = +0.39314$; $\gamma_{10} = +15.0482$; $\delta_{10} = +709.49$; $\epsilon_{10} = -13,755,1$

[2] The stop lies 0.02080 along the axis from the vertex of $R_9$ toward the vertex of $R_{10}$.

[3] If the distortion residual beyond 42.5 degrees can exceed 0.005 millimeter for a 3-inch focal length, then this surface can be left precisely plano. However, if the distortion residuals must be less than 0.005 mm. out to and including 47 degrees off-axis for a 3-inch focal length then this surface has the following shape:

$C_{19} = 0$; $\beta_{19} = 0$; $\gamma_{19} = 0$; $\delta_{19} = -.0012896$; $\epsilon_{19} = -.0019672$.

[4] This surface is precisely plano and in contact with the image plane (or photographic emulsion). Therefore, this surface can be engraved as may be required for superimposing reticle marks on each photograph. If image quality takes precedence over critical distortion correction, then this surface may be slightly reshaped from plano to favor the empirically observed optimum resolution for the particular purpose at hand. Finally, it is not mandatory that the emulsion be placed in physical contact with the surface. For some systems it may be desirable to displace the emulsion surface by a few thousandths of an inch from the glass surface. The amount of displacement will depend in tolerance on the allowable degradation of both distortion correction and image quality, which starts out very slowly for a slight displacement and builds up rapidly as the displacement of image plane from the last glass surface increases. The effect in the central field will, however, remain small and for most purposes even negligible.

Figure 2:
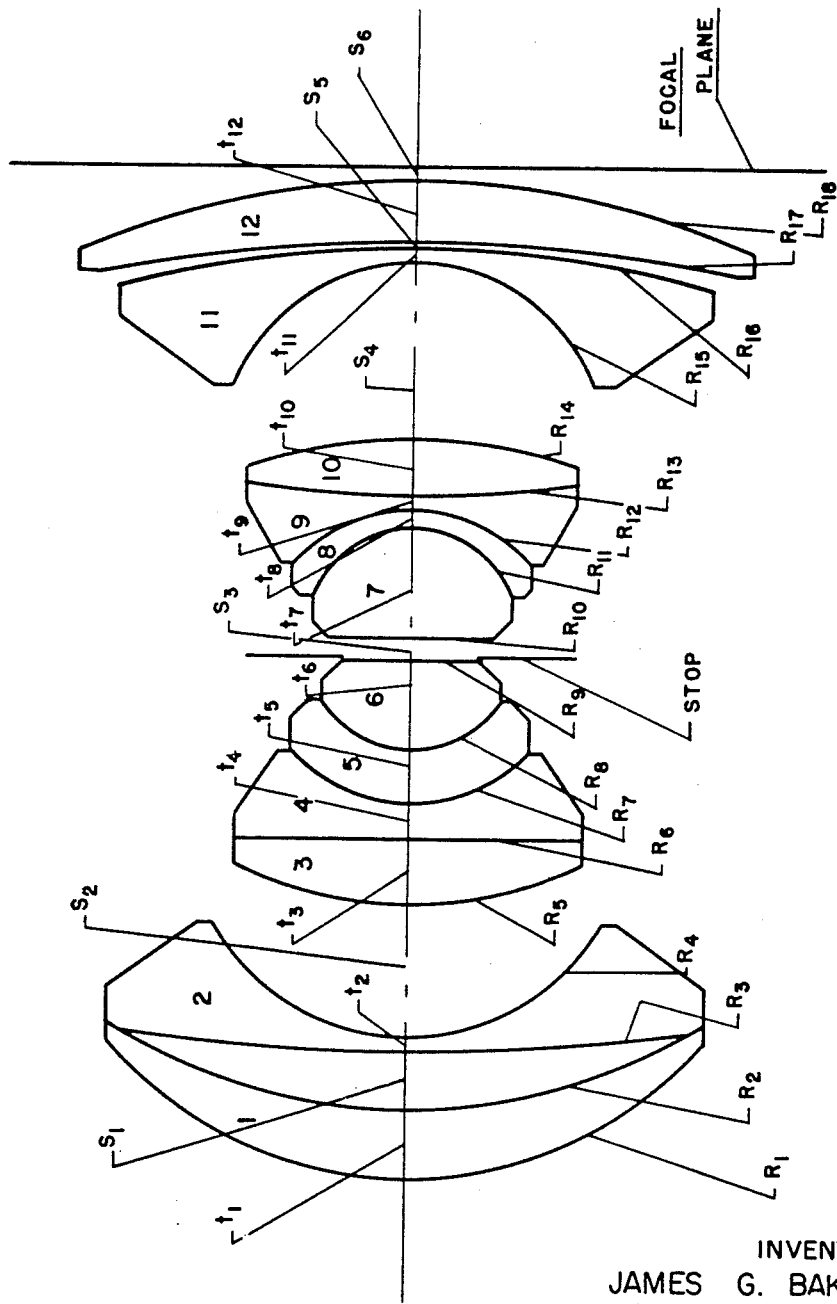
FIG. 2 is a graphical portrayal of a system such as that of Example II.

Referring now to FIGURE 2 and another example:

Example II

[C.F.L.=1.00000. E.F.L.=0.99975. f/2.5]

| Element | Radii | Thicknesses | $n_D$ | $\nu$ (nu) | Type |
|---|---|---|---|---|---|
| I | $R_1 = 1.04054$ | $t_1 = 0.18312$ | 1.78832 | 50.45 | 788505 |
|  | $R_2 = 1.48241$ | $S_1 = 0.15447$ |  |  |  |
| II | $R_3 = 5.34881$ | $t_2 = 0.03635$ | 1.65002 | 39.31 | 650393 |
|  | $R_4 = 0.59685$ | $S_2 = 0.33891$ |  |  |  |
| III | $R_5 = 1.07757$ | $t_3 = 0.16811$ | 1.8804 | 41.10 | 880411 |
| IV | $R_6 = $ plano | $t_4 = 0.09421$ | 1.62363 | 47.04 | 624470 |
| V | $R_7 = 0.43331$ | $t_5 = 0.13631$ | 1.8804 | 41.10 | 880411 |
| VI | $R_8 = 0.28800$ | $t_6 = 0.22812$ | 1.78832 | 50.45 | 788505 |
|  | $R_9 = $ Aspheric [1] | $S_3 = 0.05907$ [2] |  |  |  |
| VII | $R_{10} = $ Aspheric [1] | $t_7 = 0.27840$ | 1.78832 | 50.45 | 788505 |
|  | $R_{11} = -0.28134$ |  |  |  |  |
| VIII | $R_{12} = -0.42965$ | $t_8 = 0.04543$ | 1.8804 | 41.10 | 880411 |
| IX | $R_{13} = 3.11089$ | $t_9 = 0.03635$ | 1.67252 | 32.23 | 673322 |
| X |  | $t_{10} = 0.14654$ | 1.8804 | 41.10 | 880411 |
|  | $R_{14} = -1.35629$ | $S_4 = 0.44507$ |  |  |  |
|  | $R_{15} = -0.51339$ |  |  |  |  |
| XI | $R_{16} = -2.93132$ | $t_{11} = 0.04543$ | 1.62001 | 49.81 | 620498 |
|  | $R_{17} = -4.11697$ | $S_5 = 0.01818$ |  |  |  |
| XII | $R_{18} = -2.23274$ | $t_{12} = 0.14940$ | 1.78832 | 50.45 | 788505 |
|  |  | $S_6 = 0.03026$ [3] |  |  |  |

[1] Surfaces 9 and 10 above are both aspheric, have coefficients taken from the equation just previously herein stated and have the following shapes for a 94-degree full field:
$C_9 = +.055000$; $\beta_9 = +0.39530$; $\gamma_9 = -0.83499$; $\delta_9 = 0$; $\epsilon_9 = 0$.
$C_{10} = +.013685$; $\beta_{10} = 0.31575$; $\gamma_{10} = 3.83707$; $\delta_{10} = +33.849$; $\epsilon_{10} = 0$.
[2] The stop lies ideally 0.00154 along the axis from the vertex of the 9th surface toward the vertex of the 10th surface.
[3] This is the paraxial back focus in the color 5893. The best mean focal plane will depend on the application, but in any case will be almost coincident with this gaussian plane.

Figure 3:
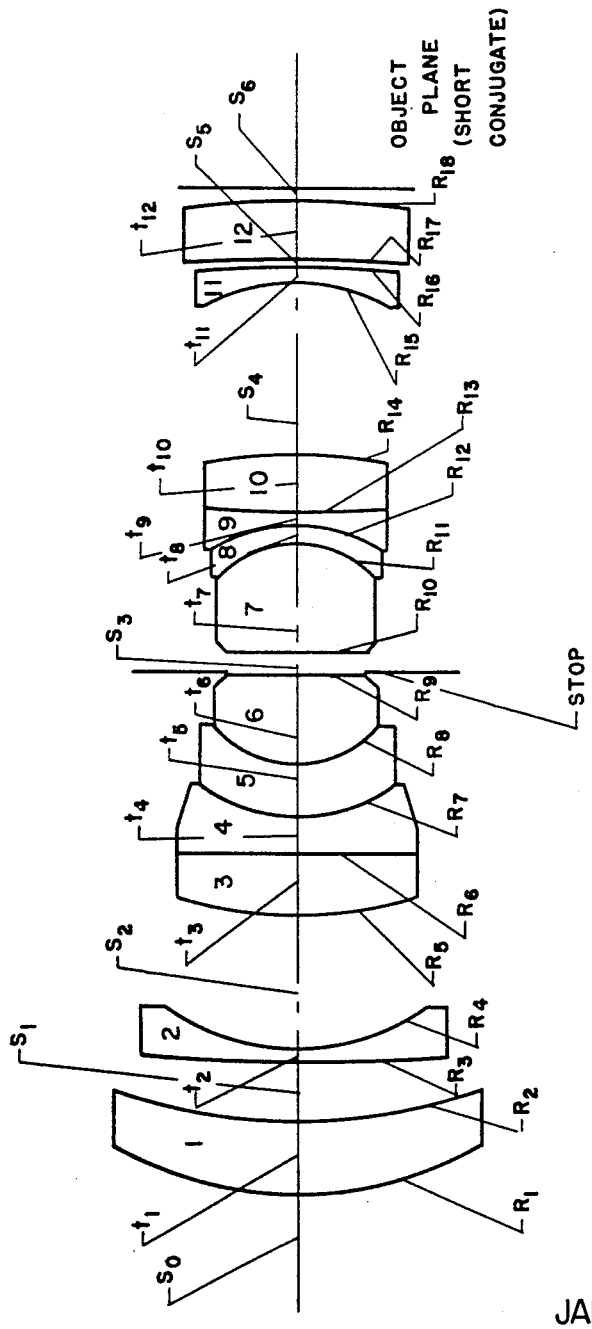
FIG. 3 is a graphical portrayal of a system such as that of Example III.

Referring now to FIGURE 3 and still another example:

Example III

[M = 20.00×. N.A. = 0.200]
[Long conjugate axial distance = 19.99499] [3]
[Short conjugate axial distance = 0.03026] [3]

| Element | Radii | Thicknesses | $n_D$ | $\nu$ (nu) | Type |
|---|---|---|---|---|---|
|  |  | $S_0 = 19.99499$ [3] |  |  |  |
| I | $R_1 = 0.97611$ | $t_1 = 0.18312$ | 1.78832 | 50.45 | 788505 |
|  | $R_2 = 1.48241$ | $S_1 = 0.15447$ |  |  |  |
| II | $R_3 = 5.34881$ | $t_2 = 0.03635$ | 1.65002 | 39.31 | 650393 |
|  | $R_4 = 0.59685$ | $S_2 = 0.33891$ |  |  |  |
| III | $R_5 = 1.07757$ | $t_3 = 0.16811$ | 1.8804 | 41.10 | 880411 |
| IV | $R_6 = $ plano | $t_4 = 0.09421$ | 1.62363 | 47.04 | 624470 |
| V | $R_7 = 0.43331$ | $t_5 = 0.13631$ | 1.8804 | 41.10 | 880411 |
| VI | $R_8 = 0.28800$ | $t_6 = 0.22812$ | 1.78832 | 50.45 | 788505 |
|  | $R_9 = $ Aspheric [1] | $S_3 = 0.05907$ [2] |  |  |  |
| VII | $R_{10} = $ Aspheric [1] | $t_7 = 0.27840$ | 1.78832 | 50.45 | 788505 |
|  | $R_{11} = -0.28134$ |  |  |  |  |
| VIII | $R_{12} = -0.42965$ | $t_8 = 0.04543$ | 1.8804 | 41.10 | 880411 |
| IX | $R_{13} = 3.11089$ | $t_9 = 0.03635$ | 1.67252 | 32.23 | 673322 |
| X |  | $t_{10} = 0.14654$ | 1.8804 | 41.10 | 880411 |
|  | $R_{14} = -1.35629$ | $S_4 = 0.44507$ |  |  |  |
|  | $R_{15} = -0.51339$ |  |  |  |  |
| XI | $R_{16} = -2.93132$ | $t_{11} = 0.04543$ | 1.62001 | 49.81 | 620498 |
|  | $R_{17} = -4.11697$ | $S_5 = 0.01818$ |  |  |  |
| XII | $R_{18} = -2.23274$ | $t_{12} = 0.14940$ | 1.78832 | 50.45 | 788505 |
|  |  | $S_6 = 0.03026$ [3] |  |  |  |

[1] Surfaces 9 and 10 above are both aspheric, have coefficients taken from the equation just previously herein stated and have the following shapes for a microscope having a 20× magnification between conjugate planes which is completely aplanatic in a field of approximately 30 degrees diameter:
$C_9 = +.055000$; $\beta_9 = +0.34525$; $\gamma_9 = -0.83499$; $\delta_9 = 0$; $\epsilon_9 = 0$.
$C_{10} = +.013685$; $\beta_{10} = +0.22297$; $\gamma_{10} = 3.83707$; $\delta_{10} = +33.849$; $\epsilon_{10} = 0$.
[2] The stop lies ideally 0.00454 along the axis from the vertex of the 9th surface toward the vertex of the 10th surface.
[3] These are the long and short conjugate axial distances respectively.

To avoid confusion I have converted Example II into Example III with a minimum change of data and sequencing, even though the former is intended primarily for use for a very distant or infinite conjugate object plane, and the latter is intended primarily for use as a wide field microscope for 20× magnification between the finite image and object planes. Therefore, I have purposely departed from the normal convention for Example III, which would have the surfaces numbered from the object plane on the short conjugate side. Similarly, I have not turned FIGURE 3 around as convention would require, where light travels from left to right. In this way it will be noted that the microscopic application requires mostly that the radius of surface $R_1$ have a smaller value to yield the finite conjugate required, and that the aspheric surfaces have a different shape required to produce fully corrected spherical aberration and coma over the aperture for the smaller field and finite throw of the microscope.

In practice, it would not depart from the spirit of the invention to introduce other small changes for application to microscopy for special purposes, such as a slight change in color correction, or for other magnifications, or for a strictly flat field.

It is noted that the dimensional data for Example III are in the same terms as the dimensional data for Example II. Therefore, one need only to multiply all dimensional data by a unit length in millimeters to find the actual constructional data for a given application. For example, if one multiplies by 25.4 mm., $R_1$ for Example III would be 24.793 mm., $R_2$ would be 37.653 mm., etc. Such a microscope would cover approximately a 10 x 10 mm. field in the object plane and would produce a projected image measuring approximately 200 x 200 mm. in the long conjugate image plane.

In general it is to be understood that minor modifications may have to be made in the radii, thicknesses, aspheric shapes and even occasionally in glass types according to the particular application, but such modifications are still to be considered as lying within the spirit of the invention. For example, if the optical objective of Example III were to be modified for microscopic projection at 100:1 magnification, then it would be necessary to alter one or more radii to achieve optimum correction for this purpose. The modified objective, however, would still belong to the same basic class of optical system described herein. Another such instance would be that if a glass type were to be changed to incorporate a more favorable type available from new developmental work in optical glass technology, the radii and thicknesses would all have to be modified accordingly. Even production runs would require close control for purposes of melt adaptation. In particular, minor modifications will need to be made from time to time in the aspheric shapes adjacent to the central stop to compensate for comatic residuals introduced by accumulated errors of construction or for altered fields of view. If the region of the spectrum of optimum color correction were to be altered from the visual to the infrared, for example, then even greater changes would have to be made in the constructional data, including changes in glass types to effect the new color correction, but even such more pronounced changes will still lie within the spirit of the invention.

Reference is made again to my U.S. Patent 2,821,113 and to the lens data given therein. It should be noted that an error of transcription has appeared in the printing. Wherever for lenses V and VI, the vertex radius is given as $= 6 \times F$, one should read $\geq 6F$, as the accompanying text adequately describes. The mathematical symbol $>$, not being on a standard typewriter, has to be handwritten on the manuscript, and this extra operation was inadvertently omitted from the copy of the patent application going to the patent printer. In accordance also with the text, one must understand that it is the numerical or absolute value of the radius that must be equal to or exceed 6 times the absolute value of the equivalent focal length, the algebraic sign for this purpose being dropped.

It will now be helpful to understanding of the present invention to compare the data given for Examples I, II and III with the optical data given in my referenced prior patent. It will be noted at once that the general run of indices of refraction calls for higher values in the improved examples, and also that the construction of the central group has been drastically altered.

Whereas in said patent leading to the $f/5.6$ objective described therein, one has the third and the eighth elements air spaced from the adjacent components of the central group, in the present examples it has proved possible to gain improved light transmission and even improved performance by resort to cemented quadruplets. That is to say, one also achieves a better state of optical correction in the cemented construction with four elements each, provided the indices are high, than can be achieved with the former cemented construction of three elements each plus an air-spaced meniscus belonging to the group, or of two elements each plus an air-spaced meniscus, where the indices are also somewhat lower. The use of the extra high index element intermediate in the quadruplet on either side permits correction in a delicate way for higher order aberrations in a fashion almost impossible to achieve in simpler forms of construction. The resulting combination also permits use of less steeply curved optical surfaces, which in turn reduces the surface by surface contributions to the several aberrations, and leads finally to highly corrected objectives of increased speed. Thus, the system of Example I is $f/3.5$ instead of $f/5.6$, and the objective of Example II without the pressure plate is $f/2.5$ instead of $f/5.6$. The optical system of Example II is thus capable of transmitting more than four times more light than the lens system of my prior patent, and manages to accomplish this without loss of resolution or even of distortion correction on a flat image plane.

A comparison with the optical system of the stated patent will also show that the numerical average of the curvatures (reciprocal radii) of the six most steeply curved surfaces of the system bears a direct relationship to the overall optical length from the vertex of $R_1$ to the image plane along the axis and to the maximum permissible lens speed. Thus:

|  | Prior Pat. 2,821,113 | Example I | Example II |
| --- | --- | --- | --- |
| Speed | $f/5.6$ | $f/3.5$ | $f/2.5$ |
| Overall Length | 1.5674 | 2.1177 | 2.5937 |
| Curvatures: |  |  |  |
| 1 | 6.993 | 5.768 | 3.554 |
| 2 | 6.993 | 5.335 | 3.472 |
| 3 | 3.279 | 2.499 | 2.327 |
| 4 | 3.279 | 2.307 | 2.308 |
| 5 | 2.959 | 2.307 | 1.948 |
| 6 | 2.747 | 2.117 | 1.675 |
| Average | 4.375 | 3.389 | 2.547 |

A correlation of the above may be posed by forming the product of the overall length and the average curvature of the six steepest curvatures. Thus, for the above three systems is obtained.

|  |  |  |  |
| --- | --- | --- | --- |
|  | 6.86 | 7.18 | 6.61 |

Some variations are to be expected in view of the different requirements, the approximate maximum lens speed adopted, the color correction, and for Example I the use of a pressure plate in the system. However, in general it will be true that the fastest optical systems of the class will be physically long and the maximum curvatures minimized to achieve correction, and the slowest optical systems of the class, properly designed to achieve compactness in keeping with the slow speed required, will be comparatively short physically and will have maximum curvatures that are enhanced, all in terms of the focal length as unit length. One could stop down an objective such as in Example II, but clearly this objective would be much too large for the work it has to do. Hence, it is here presumed that economies of construction as practiced in the art will obtain.

On this basis it is apparent that objectives of the class under consideration can well be described by having the above defined product lying in the range from 6 to 8. Below 6 the systems would be both physically short and of moderate curvatures, a situation that is not likely to work adequately over fields up to 94 degrees. Above 8 the systems would either be physically too big or would have excessive curvatures, which in turn would lead to inadequate performance. In this connection it must be kept in mind that it is the numerical average of the six steepest curvatures that is used in forming the product, and the overall physical length along the axis from the vertex of the first effective refraction surface to the image plane on the short conjugate side.

An important aspect of the invention as disclosed and claimed herein lies in the introduction of quadruplet components on either side of the central stop, which components have favorable distribution of glass types and curves to accomplish optimum correction for wide angle purposes, where the above defined product lies in the range from 6 to 8, and where it is to be understood that one or more of the cemented optical surfaces can suffer "broken contact" and still lie within the spirit of the invention. That is to say, any glass-to-air surface or break, if any so formed will have a small axial thickness, say not in excess of 0.06, down to actual contact, and that the optical power of any broken contact so formed will not exceed 0.5 in numerical value in terms of the power of the overall system as unity. Similarly, it is still within the spirit of the invention if the quadruplet component on either or both sides is converted into a quintuplet, whether or not cemented, if the work of the claimed quadruplet is only slightly modified thereby. However, it is not here claimed that any three element simplification of the quadruplet still conforms. My stated patent has taught how three elements may be used for maximum effect on either side of the central stop. The present invention presents an improvement by addition of still another element on either side, which leads to the favorable possibility of having cemented groups for efficiency, and other favorable effects.

While cemented quadruplets readily can be made up of indices of medium to high index optical glasses, which would be satisfactory for lenses in the speed range from $f/3.5$ to $f/6.3$, it is a secondary purpose of this invention to achieve even greater and indeed maximum aperture ratios by incorporating optical glasses of the highest practicable indices.

On the other hand, the uncontrolled introduction of high index glasses is completely undesirable. It is not satisfactory arbitrarily to introduce a glass of index 1.92, for example, everywhere within the construction, even though monochromatic aberrations might thereby be minimized. Instead it is here purposed to keep constant watch on the chromatic aberrations, not only the usual longitudinal and lateral primary color aberrations, but also the hybrid higher order chromatic aberrations in spherical correction, coma, astigmatism, field curvature and distortion, even into the fifth and higher orders. Therefore, an object is to select an optimum pattern of glass types to go with the introduction of the highest index glass for a selected few of the elements, necessarily the positive elements first, and within the quadruplet, one of the cemented elements on either side of the central stop.

Apart from the use of the quadruplets or from the use of the very high indices of refraction, other features of the invention continue to employ the favorable aspects described in my prior patent. For example, I still continue to employ the front and rear doublets for the purpose of obtaining precise correction for distortion and freedom from higher order aberrations of astigmatism, and curvature of field. Also, I still depend on the power and shape of the front and rear doublets to obtain a favorable uniformity of illuminating power over the 94-degree full field. The introduction of the quadruplets, however, materially affects the ranges having to do with the shapes and powers of individual elements, and components, and therefore these ranges are modified to agree with the needs of the present invention, where the cemented quadruplets are used.

As in the case of said patent, the first element of any system employing the quadruplets herewith claimed, must be meniscus, of positive optical power and curved generally around the central stop. As before, the optical power of the meniscus lies in the range from 0.2 to 0.4 of the power of the system as a whole, the thickness being neglected for the meniscus when one computes the power. However, because of the further degrees of freedom permitted by the extra elements of the meniscus in achieving color correction, the index of the first element can now be usefully increased. The prior range was found to be from 1.5 to 1.7. I now can increase this range to be from 1.5 to 1.85. The lower bound remains applicable for cases where maximum lens speed is a lesser consideration than the employment of a glass having a moderate index. The upper bound depends in the limit upon the ability of the system to be color-corrected and the capacity of available glass types to contribute thereto. As described before, in general, the higher the index for the first element the better, but the rate of improvement with increasing index is small.

In the case of the second element I have found that here too the introduction of the quadruplets affects the limits. Where the range of my prior patent for the radius of the shallow surface on the long conjugate side was found to lie in the range from one to three times the focal length in absolute or numerical value, I now find that even longer radii are possible, tending indeed toward plano. Therefore, in conjunction with the quadruplets of my invention I may extend the range of the surface of the second element on the long conjugate side to be from one times the focal length to six times the focal length in absolute value, noting that my earlier proposals are still valid in the new and more complex context.

In connection with the dioptric thin lens power of the second element I find that again the range must be extended to include the possibilities afforded by use of the quadruplets. Thus, where the prior patent taught that the range extended from $-1.5$ to $-2.5$ in terms of the power of the system taken as unity, I now find that for the faster, more complex systems, the numerical lower bound must extend to $-0.9$, giving the range to be from $-0.9$ to $-2.5$. It is possible to "normalize" the range for the systems of widely varying aperture ratio and overall length, by multiplying by the actual physical length of the system, as was done in a similar case above. Thus, in the prior system one would have a normalized range running from $-2.35$ to $-3.92$; my Example I would have a normalized value of $-3.02$; and my Example II would have a normalized value of $-2.510$. Hence, the new normalized examples come still within the old normalized range. However, such normalization procedures are tedious and I shall not try to deal with them, except where some physically descriptive meaning can be imparted. Instead, it seems more convenient to extend the ranges where required, it being understood that if normalization were to be used, the existing ranges for the most part would still apply.

With respect to the index of refraction of the second element, it was noted before that the higher index is to be preferred, and that a definite lower bound does exist on the index. In the instance at hand, I have found it expedient to extend the range once again, in view of the compensating advantages of the quadruplets. Where the old range was from 1.56 to 1.75, I now find that it should be from 1.56 to 1.85. The lower bound is explained as before, and the new upper bound depends greatly on the glass combinations to be found in the cemented quadruplets.

The large air spaces e.g. $S_2$, $S_4$, separating the outlying meniscus doublets from the inner quadruplets have the same overriding importance as I have described in said patent, except that the ranges have been affected once again. In this instance, since these are distances instead of lens powers, for normalization one must divide by the overall physical length. In said patent I established the range as from 0.08 to 0.14 of the focal length of the system for $S_2$, and found that the corresponding air space in the rear of the system, i.e., on the short conjugate side, had to lie in a range from 1.3 to 1.8 times that of the air space on the front side, i.e., $S_2$. In further work I have found that for the faster, physically more bulky optical systems, the law of diminishing returns has set in, and that an increase in $S_2$ must be all the greater to achieve a given improvement in lens speed and performance. This effect is best shown by normalization, by dividing by the overall physical length, as mentioned above. On this basis the normalized ranges goes from 0.051 to 0.089. On this same basis my Example I has a normalized value of 0.106, and my Example II, 0.131. Thus, the increase in air space goes much faster than the increase in overall length.

Indeed, my further work shows, that the increase goes even as the square of the inverse overall length. That is, by dividing once again by the overall length, my prior established range turns out to be from 0.0325 to 0.0570. The optical system shown by way of example in my prior patent has a value in this range of 0.0473. My Example I of the present invention has a value of 0.0503, and my Example II, a value of 0.0504. All these values are therefore within the doubly normalized range, which therefore on this basis continues to define the structural nature of systems of this general class.

However, it is obviously tedious to employ the doubly normalized range. Instead, as a consequence of the further design work having to do with the use of cemented quadruplets, it seems adequate simply to extend the unnormalized range, which in this way now runs from 0.08 to 0.40 for $S_2$ in terms of focal length for lenses of the class having cemented quadruplets on either side of the central stop. The lower bound remains unaffected for systems as slow as $f/6.3$, where compactness is more to be preferred than bulk. For the fast, physically bulky systems of high index glasses for speeds to $f/2.5$, the upper bound now correctly describes the physical situation where shallow curves are used at considerable distances from the central stop to achieve minimum surface by surface contributions to the several aberrations. However, this upper bound cannot be further extended with known glass types, unless indeed the optical power of the first element runs significantly below 0.2, already excluded above as lying outside of the useful range of this invention. It will be recalled from above that the dioptric power of the first element lies in the range from 0.2 to 0.4, which is still determined with respect to the upper bound of 0.4 for $S_2$ herewith established.

With respect to the ratio of the corresponding air space in the rear of the optical system to $S_2$, which I have found in prior work to lie in the range from 1.3 to 1.8, I find it necessary once again to extend the range to include all the favorable possibilities afforded by use of the cemented quadruplet construction. Indeed, as the front air space $S_2$ increases, and because the wide angle system for optimum performance retains a marked degree of symmetry around a central stop, for geometrical and numerical reasons the rear air space cannot increase as rapidly, and indeed necessarily approaches an upper bound of itself. Therefore, the ratio of front to back necessarily diminishes for the faster, physically more bulky systems. My Example I has the ratio of 1.198, and my Example II, 1.313. To some extent also the smaller ratio of Example I is derived from use of the pressure plate which causes some readjustments in the remaining data of the system. On all these counts I now find it necessary to redefine the range as from 1.1 to 1.8 to include all favorable possibilities for systems having a definite long and short conjugate. For 1:1 systems, obviously complete symmetry will prevail, in which case the lower bound must necessarily be 1.0. To include all reasonable applications, therefore, the range may be regarded as extending from 1.0 to 1.8.

With respect to the third element of the system I have not found it necessary to revise the previously determined range of indices. In my prior patent I found that this range extends from 1.62 to 1.92, which still serves to define structure in the improved class of objectives employing cemented quadruplets around a central stop. However, the new construction does lead to a need to extend the range of dioptric power of this third element. I had previously determined the range to be from 1.20 to 2.00, and noted that the lower bound if extended, caused too great a burden to be thrown on the other positive surfaces of the system. However, in the present instance, I now have allowed for this effect, and through the addition of two more elements to the system, have made it possible to extend the range favorably. While my Example I still lies within the older range, being about 1.25, my Example II has a third element with a diopter power, thickness being neglected, of 0.817. The aforesaid burden is now made up partly by the use of high indices for the first and last elements, and more particularly by the use of the extra elements within the cemented quadruplets, being primarily the fourth and ninth elements. It should be understood everywhere in this disclosure that the sequencing of surface numbers, and element numbers is for convenience in pointing out with certainty the role of the various surfaces and elements shown in the figures. With any minor change in construction within the spirit of the invention, such as broken contact whereby more optical surfaces are created, it is to be understood that while the sequencing may have to be altered, the analogous elements or surfaces are still to be considered as described herein.

Much of the optical power of the system as a whole resides in the cemented quadruplet on either side of the central stop, and indeed within the quadruplet much other correction can also be obtained. For example, much of the correction for longitudinal color aberration arises in the choice of $\nu$ (nu) values as shown in the examples, and here one has also a substantial portion of the correction for spherical aberration. The general symmetry of the two quadruplets helps minimize coma, lateral color, and distortion before very large intermediate totals arise to complicate the full compensation by the outlying elements. The use of high index glass types also helps markedly in keeping the curvatures to a minimum consistent with the task to be performed, but it should be noted also that the addition of the fourth and ninth lower index elements in the current sequencing of elements helps very materially in correcting the curvature of field that in the absence of astigmatism can best be represented by the Petzval sum. Indeed, I have found that for systems of this type the Petzval sum should be numerically small if adequate flatness of field is to be obtained. For the systems of widest angle and optimum balancing of aberrations, I have found that it is even beneficial if the Petzval sum becomes negative slightly, i.e., over-corrected, which in the central field tends to cause the mean focus in the absence of astigmatism to lie slightly on the opposite side of the flat gaussian image plane from the lens system. However, the purpose of this is to compensate the higher order residual terms in the astigmatism and field curvatures, or as otherwise considered, in the radial and tangential image surfaces, and the value of the optimum Petzval sum in no case exceeds numerically 0.05, lying therefore numerically in the range from 0 to 0.05. For this purpose the Petzval sum is to be defined in the conventional way, as the expression $$\sum_{i=1}^{N}\left(\frac{1}{n-1}-\frac{1}{n_i}\right)\frac{1}{R_i}$$

The cemented surfaces of strongest curvature in the front and rear quadruplets are most important to the optical performance of the system, and indeed these surfaces must be fairly closely curved around the image of the central stop in their respective media. This is to say that these cemented surfaces are approximately concentric surfaces, but because of refractions of the chief rays, must instead be so considered in their respective media. If the condition were to be departed from too violently, it would be found that the far off-axis effect would be severe higher order coma or higher order oblique spherical aberration, or both in various mixtures. Moreover, if these cemented surfaces separate media of widely different $\nu$ (nu) values, various higher order chromatic effects would be introduced having a deleterious effect on the performance of the system, particularly for speeds as rapid as $f/2.5$.

In my prior patent I established that the radius of curvature of either surface under discussion, being surfaces $R_8$ and $R_{11}$ as numbered therein, had to lie in the range from 0.12 to 0.20 in terms of the numerical value of the equivalent focal length of the system as a whole. I also showed that the index difference across either cemented surface had to lie in the range from 0.04 to 0.09.

In the broader class of systems employing the cemented quadruplets, I now find that the extra parameters so afforded permit new determinations of the same ranges, where we are now to consider the analogous surfaces of the Examples I and II, numbering for present purposes $R_8$ and $R_{11}$ also. Because of the physically greater bulk of the faster systems given in Examples I and II, and for reasons already discussed above having to do with the steepest six curvatures of the system, I now find that the radii can be even longer in terms of the equivalent focal length and that the index difference can be both slightly smaller and slightly larger, provided that at the same time the $\nu$ (nu) values be reasonably close together. In my prior patent the $\nu$ value difference across the referenced surfaces was 12.1. In the present examples I have found it advantageous to have even closer values, color correction being afforded otherwise by the addition of the new elements and overall readjustments. Thus, Example I has a $\nu$ value difference as to the quadruplets of only 2.89, and Example II has a $\nu$ value difference of 9.35. Therefore, I now redefine the range of radii as extending from 0.12 to 0.32, provided that at the same time the $\nu$ value difference across either or both surfaces on either side of the central stop lies in the range from 0 to 11.0, it being noted that the index difference for either surface lies also in the slightly extended range, 0.026 to 0.120. In this way, structural limitations can be defined that delimit the useful application of my invention.

In my prior patent I established that the surfaces adjacent to the central stop had to be of weak optical power and that the performance can be materially improved if either or both of these surfaces are made aspheric in a preferred way. I also showed that the vertex radius of either surface had to exceed numerically 6 times the equivalent focal length of the system, that is to say, whether slightly concave or slightly convex, either surface had to have weak optical power to avoid higher order astigmatism and other aberrations. Finally, I also showed that the maximum depth of either surface between the axis or vertex, and the periphery of the clear aperture, i.e., the sagitta, could not exceed numerically 0.001 of the focal length.

Similar considerations apply to objectives of the present invention, i.e., having cemented quadruplets. The above older considerations pertaining to the contact or vertex radius of either surface are still completely valid, inasmuch as only central pencils are hereby affected, leading to the aforementioned higher order astigmatism. Hence, for my new systems also, the numerical value of the contact or vertex radius must still exceed 6 times the focal length of the system as a whole. As these vertex radii become very great, the central area of either surface becomes correspondingly flatter, approaching the final condition of being plano. Now the further condition that the maximum sagitta not exceed 0.001 of the focal length must be modified for the objectives of the present invention. Whereas before, I dealt with optical systems of moderate speed that therefore have only moderate clear apertures for the surfaces adjacent to the central stop, I now am dealing with objectives having speeds as great as $f/2.5$. Therefore, the clear apertures of the surfaces adjacent to the central stop are necessarily much increased, and it is only natural that the sagitta of the aspheric surfaces increase beyond the previously established upper bound. My Example II at $f/2.5$ thus has a maximum sagitta numerically of 0.0024 in terms of the focal length of the system, and for some special applications there may be even greater departures from the plano. Such a special application, for example, might occur if the objective were to be designed to work in converging pencils of light where so far as the present objective is concerned, both conjugates would be on the same side of the system. Therefore, the maximum sagitta of the aspheric shape of either or both surfaces must now lie in a revised range of from 0 to 0.003 of the equivalent focal length; more simply stated, the maximum sagitta cannot exceed numerically 0.003 of the equivalent focal length of the system as a whole.

In my prior patent I also indicated that elements in front and rear having the same analogous role in symmetry around the central stop obey limits on index, curvature and air spaces similar to those already described. While the relationship between the major air spaces has already been discussed, I then added the extra consideration that the dioptric powers of the analogous elements in front and rear should not differ by more than ten percent on either side. This was stated to preserve the general symmetry of the system while permitting the designer to retain a certain freedom of action in obtaining adequate correction without departing from the spirit of the invention.

The extra degrees of freedom afforded by introduction of the cemented quadruplet and the use of physically larger optical arrangements now cause the earlier general symmetry to undergo marked changes. Extensive calculations relating to Examples I and II now show that this symmetry must be maintained only among the stronger optical surfaces but that even here the departure of front from rear must be stronger than ten percent. Obviously, if the optical systems of this invention were to be used at 1:1 conjugates and optimized for performance at1:1, then complete symmetry would prevail. It is also obvious that for conjugate ratios in the neighborhood of 1:1, say, 2:1 on either side, then comparatively minor departures from front and rear for optimized performance would still obtain. However, for $f/3.5$ and $f/2.5$ for an infinite conjugate distance on the front side, one encounters the maximum inherent departure from symmetry and must therefore expect that substantial readjustments have to be made in the optimized system. In the instances at hand I can keep these within bounds by considering only the strongest surfaces, and indeed only the six strongest surfaces.

|  | Prior Pat. 2,821,113 | Example I | Example II |
| --- | --- | --- | --- |
| Strongest analogous radii | 0.143<br>−0.143 | 0.187<br>−0.173 | 0.288<br>−0.281 |
| Next strongest | 0.305<br>−0.305 | 0.433<br>−0.433 | 0.433<br>−0.430 |
| Next strongest | 0.364<br>−0.338 | 0.472<br>−0.400 | 0.597<br>−0.513 |

Thus, we now can extend the range to lie between 0% and 20% for analogous pairs, confining our attention purely to the three strongest pairs. In this way we can omit the fine points that complicate the choice of ranges. Then again, in the above reduced considerations, neither in the prior patent nor here is it necessary that any one pair have even closer mating. The possibilities of design are such that with many parameters at hand, special corrections may be obtained for one or another aberration according to various purposes. Therefore, the ranges as extended adequately define the invention structurally without handicapping the designer in achieving special corrections.

In my prior patent I showed that for the rear doublet consisting of negative and positive menisci, one must have the numerical value of the concave radius of the last element lie in the range of 0.7 to 1.4 times the numerical value of the radius of the adjacent convex surface of the next to last element. In my further work relating to this invention defining a class of objectives with cemented quadruplets, I have found that this range still applies fairly well but must be slightly extended, owing to the greater range of possibilities afforded by the newer construction. Example I has this ratio as 0.713 and Example II as 1.404. However, for a variety of purposes, as for instance microscopy, one can vary these ratios over an even greater range to achieve some special result. Example II, for instance, might have a ratio usefully of 1.45 for certain microscopic applications, where one might wish to have critical higher order correction for astigmatism in a smaller total field of view. Similarly, Example I might have the ratio extend as low as 0.65, in view of the presence of the pressure plate and the possibility that one might want to employ a still thicker pressure plate. Hence, to encompass a satisfactory range for all favorable applications of the present invention to accommodate varying fields of view, varying lens speeds, varying conjugate ratios, and varying color correction, I now extend the range to be from 0.65 to 1.45. Clearly, if the rear doublet should be designed to be cemented, this ratio for this special case will be 1.00.

Further limitations on the secondary characteristics of the system may be stated, such as further spacing considerations and lens thicknesses. However, in view of the already distinctive nature of the new class of objectives, having cemented quadruplets on either side of the central stop, or with minor modifications thereof, further structural limitations is deemed unnecessary for present purposes. In general, all lens elements must have adequate central and edge thicknesses and in the wide angle application, these are often determined in effect purely by the need to have maximum illumination in the image at the edge of the field. However, such considerations do not enter in the case of the more restricted field for the application to microscopy and here I deem if feasible to employ variants of the basic design to achieve slight increases in the numerical aperture.

The FIGURES 1, 2 and 3 depict the general character of the optical systems, being the graphical portrayal of Examples I, II and III, respectively.

In all of the above, wherever I employ symbols, I have used N for the total number of surfaces, R for the radius of curvature, $t$ for axial thickness, S for axial separation, $n_D$ for the index refraction for the D-line of the spectrum (5893 angstroms, being the mean of the sodium doublet), and $\nu$ (nu) for the Abbe number, $\xi$ (xi) for the sagittal depth, $\eta$ (eta) for the zone height or ordinate, and small-case ($\beta$) beta, ($\gamma$) gamma, ($\delta$) delta, ($\epsilon$) epsilon for the successive aspheric coefficients. The above drawings and specification are to be considered as illustrative rather than restrictive, the scope of this invention being set out in the appended claims.

I claim:

1. A wide angle optical objective comprising an approximately symmetrical lens system, (a) said lens system having positive meniscus elements on the outside of the system curved in a general sense around a central stop, (b) a second but negative meniscus element, (c) the initial positive meniscus element shaped to compensate the refraction of the chief ray at the second negative meniscus element in part, (d) said initial element having a dioptric power, the axial thickness being neglected, from .20 to .40 of the power of the entire system and having an index of refraction from 1.5 to 1.85, (e) said second element comprising a negative meniscus and having a dioptric strength from minus .9 to minus 2.5 of the power of the entire system and having an index of refraction from 1.56 to 1.85, (f) said lens system having a multi-element component of positive collective effect lying between the said second element and the central stop, (g) said positive multi-element component comprising at least four optical elements having cemented interfaces.

(h) said such positive component having an initial positive element, being the third element of the entire system counting from the long conjugate side, (i) said such third element of the system having an index of refraction from 1.62 to 1.92 and a thin lens dioptric power from 0.75 to 2.00 in terms of the power of the system as a whole, (j) said multiple-element component having after said initial positive element thereof a negative element, another negative element and a positive element, (k) said component being axially separated from element two by an air-space separating the adjacent vertices of elements two and three having a value from 0.08 to 0.40 of the equivalent focal length of the system, (l) said component having a lowest index of refraction among the elements of which it is comprised not smaller than 1.62, (m) said lens system having generally analogous optical elements on the short conjugate side of the central stop curved generally in opposite sense, (n) said rear or short conjugate elements comprising in part a multi-element component of positive collective effect generally analogous to the front positive component, and a rear doublet, (o) said rear doublet comprising a next to last negative meniscus element and a last or outlying positive meniscus element curved in a general sense around the central stop, (p) said rear positive multi-element component comprising at least four elements having cemented interfaces, (q) said component having a last element on the short conjugate side of the component, said last element being positive and having an index of refraction from 1.62 to 1.92, said last element having a final air surface for the component curved generally around the central stop, (r) said component having ahead of said last element an initial positive element, an intermediate negative element and another intermediate negative element, (s) said component having a lowest index of refraction among the elements of which it is comprised not smaller than 1.62, (t) said rear positive component being separated axially from the adjacent vertex of the next to last negative meniscus element by a major air space analogous to the front major air space axially separating elements two and three, (u) said major air space between said rear positive component and said vertex of the next to last negative meniscus element having a ratio in axial length to its analogous front air space from 1.0 to 1.8, front and rear of the system being defined as on the long and short conjugate side of the central stop respectively, (v) said last element of the system having a concave surface on its long conjugate side curved generally around the central stop, (w) said concave surface having a radius of curvature numerically from 0.65 to 1.45 times the radius of curvature of the adjacent surface of the next to last negative meniscus element, (x) said lens system having three most steeply curved surfaces on the long conjugate side of the central stop generally analogous to three most steeply curved surfaces on the short conjugate side of the central stop, (y) said analogous three pairs having radii differing by not more than plus or minus 20% from one another taken a pair at a time, (z) both front and rear positive components employing at least one cemented surface each substantially concentric around the image of the central stop and occurring at interfaces between media having index differences on either side not exceeding 0.120 nor less than 0.026, and $\nu$ (nu) value differences not exceeding 11.0, (aa) said cemented surfaces having radii lying in the range from 0.12 to 0.32 of the equivalent focal length of the system, (bb) said front and rear positive components having air surface adjacent to the central stop with contact or vertex radii at least equal to six times the focal length of the system numerically, (cc) said lens system having the average of the curvatures of the six most steeply curved surfaces of the entire system, the average being taken without regard to algebraic sign, not exceeding 3.4, (dd) said curvatures being in terms of the power of the system as a whole so that they are the reciprocal radii where the radii are in terms of the equivalent focal length of the system.

2. The invention set forth in claim 1 including means for substantially eliminating residual distortion over a 94-degree field of view, said means including shaping predetermined surfaces of a lens system aspherically.

3. The apparatus set forth in claim 2 wherein at least some of said surfaces are conic sections.

4. The invention set forth in claim 1 in which the glass-to-air surface on each side of the central stop is aspheric, the sagittal depth of said aspheric surface on each side at its maximum point not exceeding 0.003 of the focal length of the system.

5. The invention set forth in claim 1 in which the front and rear positive components have at least one additional element lying between the substantially concentric cemented surface on each side of the central stop and the central stop for the purpose of replacing at least in part aspheric shapes referred to in claim 4.

6. The invention set forth in claim 1 in which a pressure plate is added to the system just preceding and adjacent to the image plane on the short conjugate side, said pressure plate not affecting the description in claim 1 of what is meant by the last positive meniscus element, said pressure plate being substantially a plane-parallel optical plate.

7. The apparatus set forth in claim 6 in which the pressure plate has at least one surface departing aspherically from a plane surface by a sagittal depth not exceeding 0.04 of the focal length of the system.

8. The invention set forth in claim 1 in which the long conjugate becomes the image plane and the short conjugate the object plane, the ratio of magnification laterally exceeding 10×.

9. The invention set forth in claim 5 in which the long conjugate becomes the image plane and the short conjugate the object plane, the ratio of magnification laterally exceeding 10×.

10. The invention set forth in claim 1 in which the last, positive element and the next to last, negative element share a common contact radius and can be cemented together.

11. The invention set forth in claim 9 in which the last, positive element and the next to last, negative element share a common contact radius and are cemented together.

12. A wide angle optical system having numerical data substantially as follows:

[C.F.L.=1.00000.  E.F.L.=0.99975.  f/2.5]

| Element | Radii | Thicknesses | $n_D$ | $\nu$ | Type |
|---|---|---|---|---|---|
| I | $R_1 = 1.04054$ | $t_1 = 0.18312$ | 1.78832 | 50.45 | 788505 |
|  | $R_2 = 1.48241$ | $S_1 = 0.15447$ |  |  |  |
| II | $R_3 = 5.34881$ | $t_2 = 0.03635$ | 1.65002 | 39.31 | 650393 |
|  | $R_4 = 0.59685$ | $S_2 = 0.33891$ |  |  |  |
| III | $R_5 = 1.07757$ | $t_3 = 0.16811$ | 1.8804 | 41.10 | 880411 |
| IV | $R_6 = \text{plano}$ | $t_4 = 0.09421$ | 1.62363 | 47.04 | 624470 |
| V | $R_7 = 0.43331$ | $t_5 = 0.13631$ | 1.8804 | 41.10 | 880411 |
| VI | $R_8 = 0.28800$ | $t_6 = 0.22812$ | 1.78832 | 50.45 | 788505 |
|  | $R_9 = \text{Aspheric}$ | $S_3 = 0.05907$ |  |  |  |
| VII | $R_{10} = \text{Aspheric}$ | $t_7 = 0.27840$ | 1.78832 | 50.45 | 788505 |
|  | $R_{11} = -0.28134$ |  |  |  |  |
| VIII | $R_{12} = -0.42965$ | $t_8 = 0.04543$ | 1.8804 | 41.10 | 880411 |
| IX | $R_{13} = 3.11089$ | $t_9 = 0.03635$ | 1.67252 | 32.23 | 673322 |
| X | $R_{14} = -1.35629$ | $t_{10} = 0.14654$ | 1.8804 | 41.10 | 880411 |
|  | $R_{15} = -0.51339$ | $S_4 = 0.44507$ |  |  |  |
| XI | $R_{16} = -2.93132$ | $t_{11} = 0.04543$ | 1.62001 | 49.81 | 620498 |
|  | $R_{17} = -4.11697$ | $S_5 = 0.01818$ |  |  |  |
| XII | $R_{18} = -2.23274$ | $t_{12} = 0.14940$ | 1.78832 | 50.45 | 788505 |
|  |  | $S_6 = 0.03026$ |  |  |  |

[C.F.L.=1.00000.  E.F.L.=0.99966.  f/3.5]

| Element | Radii | Thicknesses | $n_D$ | $\nu$ | Type |
|---|---|---|---|---|---|
| I | $R_1 = 0.69351$ | $t_1 = 0.12136$ | 1.56376 | 60.76 | 564608 |
|  | $R_2 = 1.05077$ | $S_1 = 0.10403$ |  |  |  |
| II | $R_3 = 2.92136$ | $t_2 = 0.02774$ | 1.8037 | 41.80 | 804418 |
|  | $R_4 = 0.47243$ | $S_2 = 0.22539$ |  |  |  |
| III | $R_5 = 0.58352$ | $t_3 = 0.13508$ | 1.8804 | 41.10 | 880411 |
| IV | $R_6 = 3.46755$ | $t_4 = 0.11512$ | 1.67252 | 32.23 | 673322 |
| V | $R_7 = 0.43344$ | $t_5 = 0.07282$ | 1.8037 | 41.80 | 804418 |
| VI | $R_8 = 0.18743$ | $t_6 = 0.13870$ | 1.7767 | 44.69 | 777447 |
|  | $R_9 = \text{Aspheric}$ | $S_3 = 0.04161$ |  |  |  |
| VII | $R_{10} = \text{Aspheric}$ | $t_7 = 0.13870$ | 1.7767 | 44.69 | 777447 |
| VIII | $R_{11} = -0.17338$ | $t_8 = 0.07282$ | 1.8037 | 41.80 | 804418 |
| IX | $R_{12} = -0.43344$ | $t_9 = 0.14181$ | 1.67252 | 32.23 | 673322 |
| X | $R_{13} = \text{plano}$ | $t_{10} = 0.13508$ | 1.8804 | 41.10 | 880411 |
|  | $R_{14} = -1.19378$ | $S_4 = 0.26994$ |  |  |  |
| XI | $R_{15} = -0.40014$ | $t_{11} = 0.02774$ | 1.75766 | 31.56 | 758316 |
|  | $R_{16} = -1.51526$ | $S_5 = 0.03468$ |  |  |  |
| XII | $R_{17} = -1.08105$ | $t_{12} = 0.12483$ | 1.8037 | 41.80 | 804418 |
|  | $R_{18} = -0.80335$ | $S_6 = 0.12578$ |  |  |  |
| XIII | $R_{19} = \text{plano}$ | $t_{13} = 0.06450$ | 1.51700 | 64.5 | 517645 |
|  | $R_{20} = \text{plano}$ | $S_{20} = 0.00000$ |  |  |  | wherein the Roman numerals designate the lens elements of the system, R is the radius of curvature, $t$ is the axial thickness, S is the axial separation, $n_D$ is the index of refraction for the D-line of the spectrum (5893 angstroms, being the mean of the sodium doublet), $\nu$ (nu) is the Abbe number, and the right-hand column indicates exemplary glass types.

13. A wide angle optical system having numerical data substantially as follows:

wherein the Roman numerals designate the lens elements of the system, R is the radius of curvature, $t$ is the axial thickness, S is the axial separation, $n_D$ is the index of refraction for the D-line of the spectrum (5893 angstroms, being the mean of the sodium doublet), $\nu$ (nu) is the Abbe number, and the right-hand column indicates exemplary glass types.

14. A wide angle optical system having numerical data substantially as follows:

[M=20.00×.  N.A.=0.200]
[Long conjugate axial distance=19.99499]
[Short conjugate axial distance=0.03026]

| Element | Radii | Thicknesses | $n_D$ | $\nu$ | Type |
|---|---|---|---|---|---|
|  |  | $S_0 = 19.99499$ |  |  |  |
| I | $R_1 = 0.97611$ | $t_1 = 0.18312$ | 1.78832 | 50.45 | 788505 |
|  | $R_2 = 1.48241$ | $S_1 = 0.15447$ |  |  |  |
| II | $R_3 = 5.34881$ | $t_2 = 0.03635$ | 1.65002 | 39.31 | 650393 |
|  | $R_4 = 0.59685$ | $S_2 = 0.33891$ |  |  |  |
| III | $R_5 = 1.07757$ | $t_3 = 0.16811$ | 1.8804 | 41.10 | 880411 |
| IV | $R_6 = \text{plano}$ | $t_4 = 0.09421$ | 1.62363 | 47.04 | 624470 |
| V | $R_7 = 0.43331$ | $t_5 = 0.13631$ | 1.8804 | 41.10 | 880411 |
| VI | $R_8 = 0.28800$ | $t_6 = 0.22812$ | 1.78832 | 50.45 | 788505 |
|  | $R_9 = \text{Aspheric}$ | $S_3 = 0.05907$ |  |  |  |
| VII | $R_{10} = \text{Aspheric}$ | $t_7 = 0.27840$ | 1.78832 | 50.45 | 788505 |
|  | $R_{11} = -0.28134$ |  |  |  |  |
| VIII | $R_{12} = -0.42965$ | $t_8 = 0.04543$ | 1.8804 | 41.10 | 880411 |
| IX | $R_{13} = 3.11089$ | $t_9 = 0.03635$ | 1.67252 | 32.23 | 673322 |
| X | $R_{14} = -1.35629$ | $t_{10} = 0.14654$ | 1.8804 | 41.10 | 880411 |
|  | $R_{15} = -0.51339$ | $S_4 = 0.44507$ |  |  |  |
| XI | $R_{16} = -2.93132$ | $t_{11} = 0.04543$ | 1.62001 | 49.81 | 620498 |
|  | $R_{17} = -4.11697$ | $S_5 = 0.01818$ |  |  |  |
| XII | $R_{18} = -2.23274$ | $t_{12} = 0.14940$ | 1.78832 | 50.45 | 788505 |
|  |  | $S_6 = 0.03026$ |  |  |  | wherein the Roman numerals designate the lens elements of the system, R is the radius of curvature, $t$ is the axial thickness, S is the axial separation, $n_D$ is the index of refraction for the D-line spectrum (5893 angstroms, being the means of the sodium doublet), $\nu$ (nu) is the Abbe number, and the right-hand column indicates exemplary glass types.

References Cited in the file of this patent

UNITED STATES PATENTS

| 2,803,997 | Hopkins | Aug. 27, 1957 |
| 2,821,113 | Baker | Jan. 28, 1958 |

FOREIGN PATENTS

| 1,172,271 | France | Oct. 13, 1958 |